TAPE CARTRIDGE

Filed March 18, 1964

MAX M. LIANG,
MICHAEL J. MARKAKIS &
SAMMY J. FERGUSON
INVENTORS

BY Robert G. Clay

ATTORNEY 3,265,317
TAPE CARTRIDGE

Max M. Liang, San Mateo, Michael J. Markakis, Palo Alto, and Sammy J. Ferguson, San Jose, Calif., assignors to Ampex Corporation, Redwood City, Calif., a corporation of California
Filed Mar. 18, 1964, Ser. No. 352,728
7 Claims. (Cl. 242—55.13)

The present invention relates generally to tape handling devices and more specifically to an improved tape cartridge for use with a tape transport.

Particular problems are involved in use of most previously available cartridges, particularly with a recorder where the tape is not moved steadily and continuously, but rather is moved in increments of various length, with the increments of movement occurring intermittently. When the recorder was started the tape was slow in reaching speed and when the recorder was stopped the tape had a tendency to overrun. Also, normally said cartridges did not contain any means for sensing tape breakage.

It is a principal object of the present invention to provide an improved tape cartridge.

It is another object of this invention to provide an improved tape cartridge that is particularly adapted for intermittent incremental operation.

It is still another object of this invention to present a tape cartridge which includes a sensing device that signals if the tape should break or form a long loop.

It is still a further object of this invention to provide a tape cartridge including improved motion-restricting means for restricting movement of the tape when the cartridge is not being used or is not on the tape machine.

Still another object of the present invention is the provision of a tape cartridge which supports the tape so that a substantial length of the tape is unobstructed, making the cartridge readily usable with a variety of different tape machines having their tape heads in different locations.

Other objects and advantages of the present invention will become apparent from the following description and the drawings, wherein.

Figure 1:
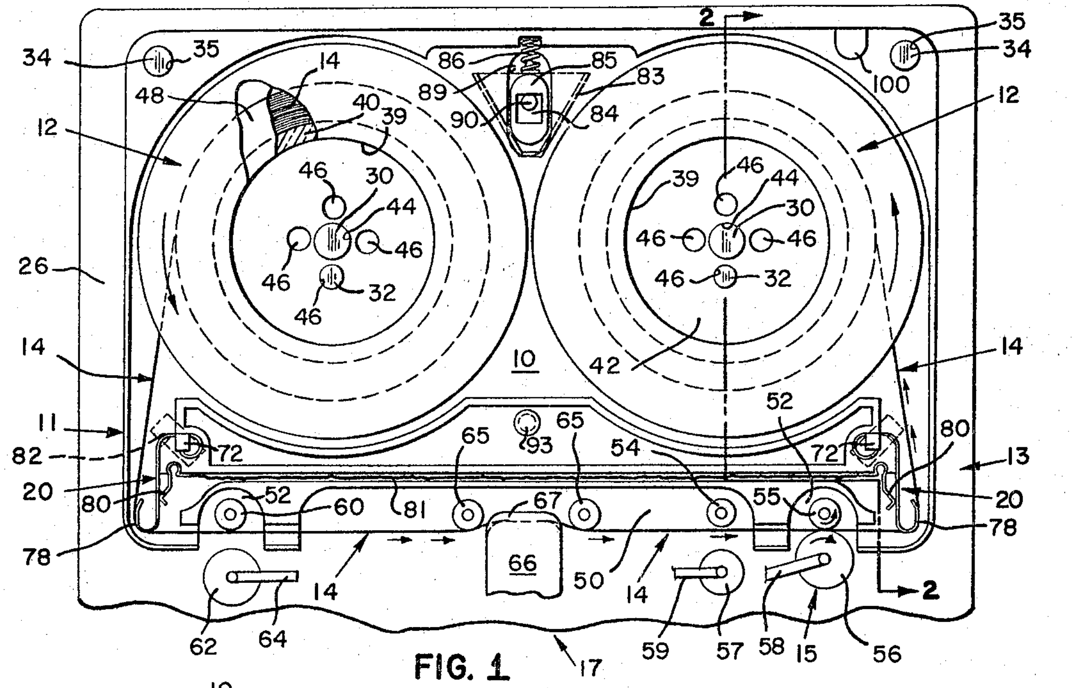
FIGURE 1 is a front view of a portion of a tape transport and a tape cartridge mounted on the transport, this construction embodying various features of the present invention.

Briefly, the illustrated magnetic tape cartridge 10 includes a casing or housing 11 having an opening and in which are rotatably supported a pair of tape reels 12. The cartridge 10 is adapted to be supported on a tape transport 13 of a magnetic tape apparatus, system or recorder 17. A magnetic tape 14 is counterwound on the reels 12, being guided intermediate the reels along an extended tape path and to a predetermined position at the opening by guide means in the casing 1. Drive means 15 on the transport 13 engages the tape 14 along the extended tape path and operates to move the tape to record information thereon. The guide means of the illustrated cartridge 10 includes a low inertia tape tensioning means in the form of a tensioned resilient spring arm 20 that contacts the tape between the drive means 15 and one of the reels 12. The spring arm 20 is secured within the casing 11 and is a part of the cartridge 10. The low inertia tape tensioning means allows quick starting and stopping of the tape by reducing inertia problems caused by starting and stopping the mass of the reel which includes the reel itself, the roll of tape on the reel, and the turntable and other mechanism connected to the reel.

More specifically the illustrated cartridge 10 is particularly adapted to be used with a recorder 17 which records and reproduces digital information on tape. The recorder includes the tape transport 13 which comprises a vertically disposed tape deck or plate 26 having a spaced-apart pair of rotatable turntables 28. The turntables 28 are rotatable about horizontal axes, which are generally level with one another, by motive means (not shown) which may be of the conventional type. As particularly shown in FIGURE 2, each turntable 28 is provided with a spindle 30 located centrally thereof and extending outwardly. Each turntable 28 also includes a spring-biased connecting pin 32 which is located adjacent to the spindle 30 and which normally extends outwardly from the face of the turntable. The connecting pin 32 is retractable into the turntable but is normally biased to the outwardly extending position.

As shown in FIGURE 1, the cartridge 10 includes the casing or housing which is generally flat and rectangular. The casing includes a pair of parallel, large rectangular face walls 36 and 38 which are spaced from each other by side walls integrally connected thereto. The casing 11 is preferably made of a plastic which is lightweight, durable, rigid, strong, and also desirably transparent so that the interior of the casing is readily viewable. The casing may be made in two cast pieces and the pieces joined together, as by suitable screws.

Figure 2:
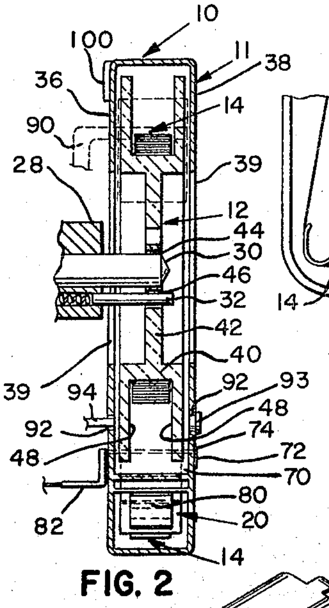
FIGURE 2 is a reduced side sectional view taken generally along line 2—2 of FIGURE 1.

The cartridge 10 is assembled or positioned on the tape transport 13 as shown generally in FIGURES 1 and 2, with pins 34 on the transport received in apertures 35 in the upper corners of the casing. As seen in those figures, the face walls 36 and 38 are disposed generally vertically with one of them in juxtaposed relation to the tape deck or plate 26 of the machine. Either face wall 36 or 38 may be positioned adjacent to the plate 26 because of the construction of the illustrated cartridge 10, as will become more apparent from the following description.

The pair of tape reels 12 are disposed within the case or housing 11 in side-by-side relation. Each reel 12 is adapted to be supported upon one of the spindles 30 and connected to the associated turntables 28 by the pin 32 when the cartridge is assembled on the tape transport. To permit access by the spindles 30 and the pins 32 to the reels 12, the face walls 36 and 38 of the case 11 are provided with two opposed pairs of circular access apertures or holes 39. Each pair of holes 39 is located with one hole generally aligned with and at either side of the center portion of the reels. Thus, each reel 12 has an access aperture 39 in the face wall on either side of it.

The reels 12 are generally supported in position in the casing 11, however, they are loosely positioned for a certain amount of movement within the case. In this connection, as shown in FIGURE 1, generally circular cavities are provided in the casing to receive the reels, the cavities having a larger diameter than the reels. When the cartridge is assembled on the tape transport, the specific location of the reels is defined by their being mounted on the spindles 30.

Each of the illustrated reels 12 includes a cylindrical hub 40 having a transverse wall 42 extend across the hub about midway between its ends. Each of the walls 42 is provided with a center hole or aperture 44 for receiving the associated spindle 30. The outer ends of the spindles 30 are suitably tapered to guide the spindles into the center holes 44 when the cartridge is placed on the tape machine.

The wall 42 of each illustrated reel 12 is provided with four connecting holes 46 disposed circumferentially around the center hole 44. The holes 46 are the same distance from the center of the center hole 44 as the pin 32 is from the center of the spindle 30. Thus, if the turntable 28 and the reel 12 are in particular rotational alignment the pin 32 of the turntable will extend into the hole 46 of the reel 12 to connect the reel to the turntable for common rotational movement. If the pin 32 is not initially in alignment with one of the holes 46 when the cartridge is assembled on to the tape transport, the pin 32 will be depressed by the wall 42 of the reel, but relative rotational movement thereafter between the reel and the turntable will permit the pin 32 to enter the hole 46 and create the desired rotational driving engagement.

As shown particularly in FIGURE 2, each of the reels 12 is provided with a pair of annular flanges 48 connected to the opposite edges of the cylindrical hub 40 of the reel and extending outwardly generally perpendicular to the axis of the hub. The tape 14 is wound around the hub 40 between the flanges 48, with the flanges serving to maintain the roll of tape on the reel.

As noted above, the tape 14 is counterwound on the two reels 12. More specifically, as viewed in FIGURE 1, one end of the tape 14 is connected at one end to the reel at the left and wound counterclockwise around the hub of that reel. The other end of the tape is connected to the reel at the right and wound in a clockwise direction around the hub of that reel. When the tape moves in the forward direction, as illustrated by the small arrows in FIGURE 1, both reels 12 rotate in the counterclockwise direction so that the reel on the left side serves as the feed or supply reel from which the tape is unwound while the other reel serves as the take-up reel onto which the tape is wound. For reverse operation, the reels turn in the clockwise direction and the tape is fed from the reel on the right to the other reel.

As shown best in FIGURE 1, the portion of the tape intermediate the two reels is guided and maintained in the extended tape path by suitable guide means on the cartridge casing 11. This extended path is in a generally rectangular loop configuration extending in a generally vertical direction from the outside of either reel and extending across the cartridge in a generally horizontal channel in the casing 11 adjacent to the lower edge or portion of the casing. The illustrated cartridge casing 11 is provided with an elongated center recess 50 centrally of its lower edge or portion. The elongated center recess 50 exposes a substantial length of the tape 14 in the center of the horizontal portion of its extended path. The longitudinal horizontal edges of the face walls 36 and 38 defining the center recess 50 are spaced sufficiently above the horizontal path of the tape 14 to permit the positioning of mechanism on the tape transport above the path of the tape when the cartridge is positioned on the transport.

Spaced from either side of the center recess 50 along the lower edge or portion of the cartridge casing 11 are two side recesses 52 which, in the illustrated construction, are considerably smaller than the center recess and expose a relatively short length of the tape travelling in the horizontal portion of the extended path. If desired, the casing 11 could be constructed with the center and side recesses combined into one continuous recess to provide greater flexibility of use of the cartridge on transports of various configurations.

The location or position of the cartridge 10 on the transport 13 is shown best in FIGURE 1. The transport 13 is provided with a continuous forward drive capstan 55 and an incremental forward driving capstan 54. The forward direction is indicated by small arrows in FIGURE 1. The capstans 54 and 55 are mounted for counterclockwise rotation on the tape deck 26 and extend outwardly from the deck. The capstan 55 is received in the end recess 52 on the right side of the cartridge as viewed in FIGURE 1 and the capstan 54 is receievd in the center recess 50. The capstans 54 and 55 are positioned, respectively, above the portions of tape crossing the recesses 50 and 52. Below that portion of tape crossing recess 52, a pressure or pinch roller 56 is rotatably mounted at the free end of an arm 58 that is pivotally mounted on the plate 26. Below that portion of tape crossing recess 50, a pressure or pinch roller 57 is rotatably mounted at the free end of an arm 59 that is pivotally mounted on the plate 26. The undeflected path of those portions of tape is sufficiently below the capstans and above the normal positions of the pinch rollers to prevent interference, jamming, or damage to the tape from contact with the capstans and rollers when the cartridge is positioned on the transport.

Means for driving the tape in the reverse direction is provided at the recess 52 on the left side of the cartridge. Specifically, a reverse drive capstan 60 extends from the plate 26 and is received in the recess 52 above the portion of tape crossing that recess while a pressure roller 62 is rotatably mounted on the end of an arm 64 that is pivotally supported on the plate 26. The capstan 60 and the roller 62 are normally positioned away from the tape path when the cartridge is placed on the transport.

When the recorder is activated, suitable means (not shown) move one of the pressure rollers upwardly against the bottom of the tape to force it against the associated drive capstan to provide either incremental forward movement, continuous forward movement, or reverse movement. The other two rollers are in lowered positions to permit free movement of the tape past their associated capstans. A predetermined amount of pressure is exerted between the actuated roller and its capstan to ensure proper driving of the tape. The rollers are freely rotatable while the drive capstans are each connected to suitable drive mechanism (not shown) which serves to rotate that capstan to drive the tape. When the recorder is operated as a digital recorder, the tape is driven intermittently in increments by capstan 54 to coincide with the feeding or occurrence of information or data signals to be recorded by the recorder. The capstans, the rollers, and the associated mechanism comprise the drive means 15 for the illustrated structure.

The illustrated tape transport 13 includes a pair of guide pins 65 mounted on the plate 26 and extending outwardly therefrom. The pins 65 are received in the center recess 50, preferably somewhat above the undeflected path of the tape through that recess. The illustrated guide pins 65 are spaced apart from one another and are positioned at generally the same level. Movably supported on the tape transport below the path of the tape through the recess 50 and generally intermediate the pins 65 is a tape recording head 66. The head 66 is movable upwardly against the underside of the tape 14 when the machine is put into operating condition. The guide pins 65 restrain upward movement of the tape which tends to form or wrap the tape around the head and to provide a generally taut condition of the tape as it passes across the recording head 66. The head itself is provided with a pair of spaced guides or ribs 67 which serve to locate and guide the tape in the proper position relative to the head. The head 66 may also serve to erase and/or reproduce the information or data recorded on the tape, or additional heads and additional guide pins may be used for these functions.

Figure 4:
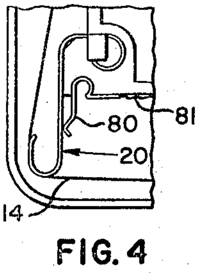
FIGURE 4 is an enlarged front view of a portion of the illustrated tape cartridge including the spring arm in a steady-state position.

The means which guide and maintain the tape along its extended path within the cartridge comprise the low inertia tape tensioning means in the form of the pair of spring arms 20, one arm located at either lower corner of the cartridge case 11. FIGURES 1 and 4 of the drawings illustrate the generally steady-state condition of the spring arms 20. As shown in those drawings, when the tape 14 is not moving, it passes around the spring arms 20 and is guided and maintained generally by the arms in its extended path with preferably sufficient tension between the spring arms 20 and the tape 14 to maintain the tape in a generally taut condition in the recesses. When the tape 14 is moved at a constant rate the spring arm 20 will tend to assume a steady state condition, generally similar to that shown in FIGURES 1 and 4, although the spring 20 between the means driving the tape and the feed or supply reel from which the tape is unwinding may be deflected to a somewhat greater degree than when the tape is not moving.

Figure 3:
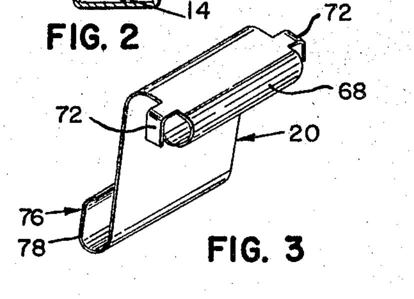
FIGURE 3 is an enlarged perspective view of a spring arm of the illustrated tape cartridge.

One of the spring arms 20 is shown in particular detail in FIGURE 3. The illustrated spring arm 20 is formed from a generally vertically extending elongated, relatively wide section of leafspring made from a flexible, resilient electrically conductive material such as spring steel. The upper portion 68 of the spring arm 20 is formed or rolled into a curved generally tubular configuration. The tubular portion 68 extends around and is fastened to a post 70, which extends transversely between the face walls 36 and 38 adjacent a lower corner of the casing 11, to support the arm 20 in position. The upper portion 68 of the spring arm 20 includes a pair of outwardly extending fingers or contacts 72 which extend outwardly through apertures 74 in the face walls 36 and 38 of the casing 11 and are then turned downwardly, as shown best in FIGURES 2 and 3, outwardly of the casing.

The lower edge or portion 76 of the illustrated spring arm 20 is formed or rolled into a curved generally tubular configuration to provide a curved, low friction contact or guide surface 78 for guiding and directing the tape around one corner of its rectangular extended path. The other spring arm 20 is of similar construction and is disposed at the other lower corner of the casing to provide guiding and direction for the tape around the other corner of the rectangular extended path.

Figure 5:
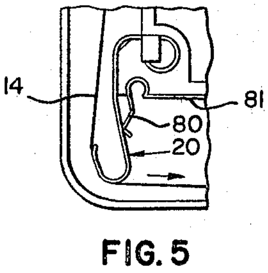
FIGURE 5 is a view generally similar to FIGURE 4, with the spring arm in an impacted or deformed position.

As noted above, the steady state stationary or no movement position of the spring arms 20 is illustrated in the FIGURE 4 where there is preferably sufficient tension between the spring arms and the tape to maintain the tape in a taut condition. A steady state position for the spring arms 20 when the tape is undergoing constant or steady movement would be generally similar to that shown in FIGURE 4, with possibly some small increased tension and deformation of the spring arm between the drive means and the supply reel. FIGURE 5 illustrates the tensioned or deformed position of the spring arm 20 incident to an intermittent incremental movement of the tape in the extended path by the incremental forward drive capstan 54. Of course in general, the amount of tape which is drawn past the forward drive capstan 54 is also fed from the feeding or supply reel. However, the deformation of the lower inertia spring arm 20 that is between the drive means and the feed reel allows fast stopping and starting of the tape. The forces needed are substantially reduced. The forces necessary to overcome the large inertia of the reel and associated equipment which would be necessary if the reel itself were required to respond immediately to each incremental intermittent movement of a portion of the tape are not required.

The low inertia tape tensioning means for allowing intermittent incremental movement in the rearward direction by the rearward drive capstan 60 is provided in the illustrated machine by the spring arm 20 at the lower right-hand corner of the cartridge as viewed in FIGURE 1.

In the illustrated embodiment, the cartridge is provided with means for sensing breakage or a long loop in the tape. In this connection, the casing 11 is provided with a pair of interconnected leaf contacts 80, each of which contacts 80 is fixedly mounted in the casing in a position adjacent to one of the electrically conductive spring arms 20. The spring arms 20 are maintained in contact with the respective contacts 80 while the spring arms are in a steady state position such as shown in FIGURE 4 and also when the spring arms are further tensioned to a position such as that shown in FIGURE 5. The interconnecting contacts 80 are electrically connected to one another by a suitable electrical conductor 81 disposed in a horizontal channel in the casing 11. As shown best in FIGURE 2, for each spring arm 20, a finger 72 is positioned outwardly of the casing at either side. Thus, no matter which facing wall 36 or 38 is positioned adjacent to the transport, one of the fingers 72 of each spring arm will be positioned facing the transport. Secured to the plate 26 are a spaced pair of contact tabs or elements 82 that are so positioned that when the cartridge is assembled on the transport the tabs 82 engage the fingers 72. This electrical connection of the tabs 82 and the fingers 72 places the cartridge circuit (the spring arms 20, the interconnecting contacts 80, and the electrical conductor 81) in series with an electrical circuit of the tape system or recorder 17.

Figure 6:
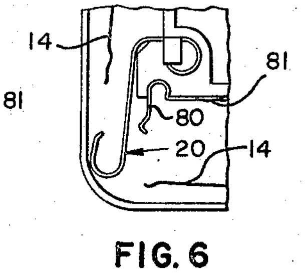
FIGURE 6 is a view generally similar to FIGURES 4 and 5 with the spring arm in a fully released position after the tape has broken.
Figure 7:
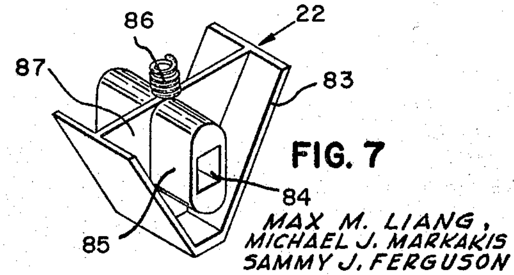
FIGURE 7 is a perspective view of the locking member for the illustrated tape cartridge.

If the tape 14 should break, as illustrated in FIGURE 6, each spring arm 20 will move to a position such as shown in that figure where it is out of contact with the interconnecting contact 80, thereby breaking the circuit of the cartridge. This will in turn serve to break the afore-mentioned circuit of the tape recorder. That circuit of the tape recorder may shut off all or a portion of the recorder and desirably will also present a signal such as a sound or a light to make the operator of the recorder aware of the break in the tape. Similar action will result from a long loop.

When the cartridge 10 is not assembled to the transport the rotation of the reels 12 is prevented by a stop or lock member 22 which engages each of the reels. The illustrated lock member 22 is carried by the casing 11 generally above and intermediate the reels for vertical downward movement into engagement with the reels. The lock member 22 includes a wedge-shaped section 83 which is disposed with the smaller end downward. An oblong section or hub 85 is disposed centrally of the wedge-shaped section and is joined thereto by a web 87. Both ends of the oblong section 83 extend beyond the edges of the wedge-shaped section 85 and are respectively received in elongated vertical opposed slots 89 disposed in the face walls 36 and 38 intermediate the reels 12. The reels are sufficiently close together and the member 22 is so constructed and disposed that when it is moved downwardly it will engage both of the reels, tending to stop or restrict their rotation. The illustrated member 22 is urged into its downward motion-restricting or stop position by a small coil spring 86 disposed in the casing 11 between the hub 85 and the upper wall of the casing. The hub 85 is provided with a square core or aperture 84 which, as shown best in FIGURE 2 receives an elongated part or arm 90 extending outwardly from the plate 26 when the cartridge is positioned on the tape recorder. When the recorder is placed in operating or ready-to-operate condition, the arm 90 is moved upwardly to move the member 22 upwardly against the spring 86 to release its engagement with the reels 12 to permit their rotation.

Inasmuch as the illustrated cartridge is reversible, i.e., may be used with either side or face wall toward the recorder, it is provided with means to prevent inadvertent use of the cartridge in the wrong position. In particular, each face wall 36 and 38 is provided at a point along its vertical center line with a hole or aperture 92 for removably receiving a button 93. The hole 92 is matched by a post 94 extending outwardly from the transport. The post 94 will be received in the hole 92 of the adjacent face wall of the cartridge when the cartridge is positioned on the recorder. When information is recorded on the tape while the cartridge has a given side or face wall toward the recorder, the button 93 may be inserted in the hole 92 in that face wall to prevent the cartridge from being replaced in the machine with that same side toward the recorder which could result in destroying valuable information. The button 93 can be used for various other purposes. For example, the button 93 may be positioned to pre-designate which way the cartridge should be facing on the recorder to reproduce recorded information and it will prevent the operator from putting the cartridge on the recorder facing other than in the designated direction.

The illustrated cartridge is also provided with means for prohibiting inadvertent re-recording of the tape. An insert 100 is removably mounted on the cartridge in position to actaute a switch (not shown) on the recorder when the cartridge is placed in operating position on the recorder. This switch permits recording of the tape. When re-recording is to be prevented, the insert 100 is removed and the switch which permits recording is not actuated when the cartridge is placed on the recorder.

Thus, the illustrated tape cartridge 10 is particularly suited for intermittent incremental tape movement. This tape cartridge provides low inertia tape tensioning means which are contained within the cartridge itself for engaging the tape to guide it, to maintain desired tension upon it, and to allow quick start and stop of tape. Further, in the illustrated tape cartridge, the tape tensioning means also serves to signal a break or a long loop in the tape. Still further, the illustrated tape cartridge is adapted to be used with a variety of machines with recording, playing, and/or erasing heads or like equipment which are located at various locations. This adaptability is provided because of the substantial length of tape which is exposed without obstruction to access by these variously located heads and like equipment. The illustrated tape cartridge also includes simple and improved motion-restricting means to restrict movement of the reels when the tape cartridge is not positioned on the recorder.

Various modifications and changes in the illustrated structure may be made without departing from the spirit or scope of the present invention.

Various features of the present invention are set forth in the following claims.

What is claimed is:

1. A tape cartridge adapted for use with apparatus for recording and reproducing signal information, said cartridge comprising:

(a) a casing having an opening therein, (b) a pair of tape reels rotatably supported in the casing, each of said reels adapted to have one end of the recording tape wound around it, (c) guide means in said casing for directing and maintaining the portion of tape intermediate the two reels in an extended path in a looped configuration, said extended path positioning the tape at a predetermined location relative to said opening, said guide means including at least one resilient element supported in said casing between one of said reels and said opening, said element being adapted to engage the tape and tension the same, and (d) an electrical contact carried by said casing in operative relation to said resilient element, said contact being operated by a predetermined movement of said element.

2. A tape cartridge adapted for use on a tape recording and reproducing apparatus having a pair of spaced-apart electric contacts connected to an open series circuit of the tape apparatus, said cartridge comprising:

(a) a casing of nonelectrically conductive material, (b) a pair of reels which are rotatably supported within the casing, each of said reels adapted to have one end of the tape wound around it, (c) guide means on the casing for guiding and maintaining the tape intermediate the reels in an extended tape path, (d) an electrically conductive resilient low inertia element supported on the casing so as to be movable under tension from a first unrestricted position where it extends outside the extended tape path to a second restricted position where it is within the extended tape path, said element being adapted to be maintained in said second position by engagement with the tape disposed in the extended path, (e) first and second electrical contact means on the cartridge that are exposed externally of the casing, each of said cartridge electrical contact means being adapted to abut one of the electrical contacts on the tape apparatus when the cartridge is positioned thereon, said first cartridge electrical contact means being electrically connected to said resilient element, said second cartridge electrical contact means engaging said resilient element when said element is in the second position, but not engaging said element when said element is in the first position, whereby when the tape cartridge is positioned on the tape apparatus the series circuit of the tape machine is normally completed, but if the tape breaks or forms a long loop the resilient element moves to its first position to open the series circuit of the apparatus.

3. A reversible tape cartridge adapted for use with apparatus for recording and reproducing signal information, the apparatus including a pair of spaced electrical contacts connected to an open series circuit of the apparatus, said cartridge comprising:

(a) a generally flat casing of electrically nonconductive material and having opposed generally flat face walls, said casing being adapted to be operatively positioned on the apparatus with either face wall adjacent thereto, (b) a pair of tape reels rotatably supported in the casing, each of said reels adapted to receive one end of a recording tape wound around it, (c) guide means in said casing for directing and maintaining the portion of tape intermediate the two reels in an extended path, said extended path positioning the tape for operative engagement with driving means and recording means on the apparatus, said guide means including a pair of resilient, low inertia elements of electrically conductive material supported and arranged to normally lie in a first position where they extend to a point outwardly of the said extended path of the tape, said elements adapted to engage the tape at opposed positions in said extended path and to urge the tape outwardly of said extended path in opposite directions, a portion of each of said resilient elements extending through said casing and being disposed externally of said casing at each face wall, said portions at one face wall being adapted to engage respectively the spaced electrical contacts on the apparatus when said casing is positioned on the apparatus with that face wall adjacent thereto, said portions at the other face wall being adapted to engage respectively the spaced electrical contacts on the apparatus when said casing is positioned on the apparatus with said other face wall adjacent thereto, (d) electrical conducting means in said casing that engage said resilient elements when they are in a said second position within said extended path by virtue of their engagement with the tape, said conducting means thereby electrically interconnecting said resilient elements, said conducting means being out of engagement with said resilient elements when said elements are not confined within the extended path but permitted to lie in their normal first position, whereby the apparatus series circuit which is completed when the cartridge is assembled on the apparatus with either face wall adjacent thereto is broken when there is a break or a long loop in the tape.

4. A tape cartridge adapted to position a recording tape on a tape recording and reproducing apparatus including a pair of spaced capstans and a plurality of other tape-engaging elements positioned between said capstans, said cartridge comprising:

(a) casing adapted to be removably positioned on the apparatus and including at least one relatively long edge, (b) a pair of tape reels rotatably supported in said casing, each of said reels adapted to have one end of the tape wound around it, (c) guide means in said casing for directing and maintaining the portion of tape intermediate the two reels in an extended path which includes an elongated section disposed adjacent to said long edge of said casing, (d) said casing also including means defining a pair of recesses mating with said capstans and at least one elongated recess at said long edge of said casing to expose a substantial portion of the tape, said elongated recess being proportioned and arranged to permit all of said plurality of other tape-engaging elements to be positioned adjacent either side of said exposed portion of tape incident to said cartridge being positioned on the apparatus, whereby said tape cartridge is adapted for use with various tape apparatus having variously located equipment for engaging the tape.

5. A tape cartridge adapted to position a tape on a tape apparatus including a pair of spaced capstans and a plurality of other tape-engaging elements positioned between said capstans, said cartridge comprising:

(a) a generally flat casing adapted to be positioned on the machine and having at least one long edge, (b) a pair of tape reels rotatably supported in said casing in generally side-by-side relation, each of said reels adapted to have one end of the tape wound upon it, (c) guide means in said casing for directing and maintaining the portion of tape intermediate the two reels in an extended path which includes an elongated generally linear section disposed adjacent to said long edge of said casing, (d) said casing also including means defining a pair of recesses mating with said capstans and an elongated recess at said long edge of said casing to expose a substantial continuous length of said linear section of the tape, said elongated recess being proportioned and arranged to permit all of said plurality of other tape-engaging elements to be positioned adjacent either side of said length of tape incident to said cartridge being positioned on the apparatus, whereby said tape cartridge is adapted for use with various machines having variously located tape-engaging equipment.

6. A reversible tape cartridge adapted for use with apparatus for recording and reproducing signal information, said cartridge comprising a casing having a pair of opposed face walls, said casing being adapted to be operatively positioned on the apparatus with either face wall adjacent thereto, said casing adapted to support a recording tape therein for recording or reproducing on the tape when either face wall is adjacent the apparatus, said casing including a pair of apertures, each of said apertures being located in one of said face walls and adapted to receive therein a mating part on the apparatus when said cartridge is positioned for operation on the apparatus with the face wall having that aperture adjacent to the apparatus, said apertures being opposed from one another and disposed along a line of symmetry of the casing so that the aperture adjacent the apparatus is aligned with the mating part no matter which face wall is adjacent the apparatus, each of said apertures being adapted to have an element removably secured therein to prevent the mating part from being received therein, said mating part protruding from said apparatus for a dimension not greater than the spacing of said element from said apparatus when said element is secured in the aperture most remote from said apparatus, whereby said cartridge cannot be operatively positioned on the apparatus with the aperture in which the element is secured adjacent the apparatus.

7. A reversible tape cartridge structure adapted for use with apparatus for recording and reproducing signal information, said structure comprising in combination:

(a) a tape cartridge casing having a pair of opposed face walls, said casing being adapted to be operatively positioned on the apparatus with either face wall adjacent thereto, said casing adapted to support a recording tape therein for recording or reproducing on the tape when either face wall is adjacent the apparatus, said casing including a pair of apertures, each of said apertures being located in one of said face walls and adapted to receive therein a mating part on the apparatus when said cartridge is positioned for operation on the apparatus with the face wall having that aperture adjacent to the apparatus, said apertures being opposed from one another and disposed along a line of symmetry of the casing so that the aperture adjacent the apparatus is aligned with the mating part no matter which face wall is adjacent the apparatus, and (b) a part removably secured in one of said apertures to prevent said cartridge casing from being positioned on the apparatus with that aperture adjacent the apparatus, said part being adapted to be removably secured in the other of said apertures to prevent said cartridge casing from being positioned on the apparatus with that other aperture adjacent to the apparatus, said mating part protruding from said apparatus for a dimension not greater than the spacing between said removably secured part and said apparatus when said removably secured part is removably secured in the aperture most remote from said apparatus.

References Cited by the Examiner

UNITED STATES PATENTS

| | | | |
|---|---|---|---|
| 2,216,909 | 10/1940 | Foster | 242—55.13 X |
| 3,000,680 | 9/1961 | Zelenko | 312—111 |
| 3,027,110 | 3/1962 | Andrews | 242—55.13 |
| 3,051,405 | 8/1962 | Lyon | 242—55.12 |
| 3,075,717 | 1/1963 | Kingston | 242—55.13 |

MERVIN STEIN, *Primary Examiner.*

LEONARD D. CHRISTIAN, *Examiner.*